Figure 1:
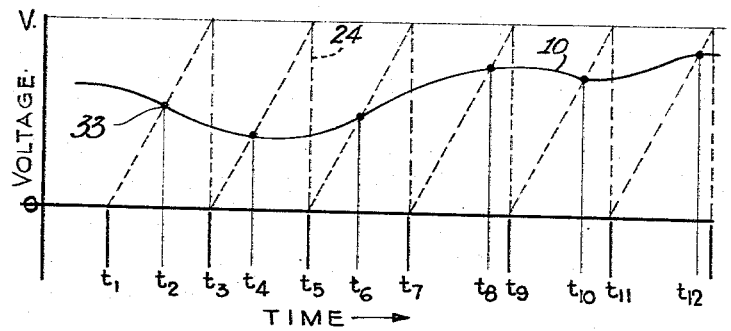

Dec. 12, 1967   G. V. CLIFFORD   3,358,200
ELECTRO-MECHANICAL INTEGRATOR
Filed April 1, 1964   2 Sheets-Sheet 1

INVENTOR
George V. Clifford
BY
Harold Q. Weir
PATENT AGENT

Dec. 12, 1967     G. V. CLIFFORD     3,358,200
ELECTRO-MECHANICAL INTEGRATOR
Filed April 1, 1964
2 Sheets-Sheet 2

INVENTOR
George V. Clifford
BY
Harold Q. Weir
PATENT AGENT

United States Patent Office 3,358,200
Patented Dec. 12, 1967

3,358,200
ELECTRO-MECHANICAL INTEGRATOR
George V. Clifford, Ottawa, Ontario, Canada, assignor to Computing Devices of Canada Limited, Ottawa, Ontario, Canada
Filed Apr. 1, 1964, Ser. No. 356,572
7 Claims. (Cl. 318—8)

This invention relates to an electro-mechanical integrator, and in particular it relates to an integrating device for receiving an input signal having a varying characteristic and for providing an output rotation proportional to the integral of the varying characteristic of the input signal.

Electro-mechanical integrators have many applications in electrical and mechanical apparatus. For example, these integrators are used in navigational computers to integrate the ground speed of an aircraft or other moving vehicle and thus obtain an indication of miles travelled. In such computers there may be a mechanical or electrical input signal which may vary in amplitude or phase according to the ground speed, and the output may drive a mechanical counter indicating distance travelled.

Prior art electro-mechanical integration has been accomplished in various ways. In one prior art integrator a variable speed motor is arranged to drive an output shaft at a variable speed proportional to the amplitude of an electrical input signal which is to be integrated. The angular displacement of the output shaft is the time integral of the rotational speed of the shaft, and thus is proportional to the integral of the input signal. This type of integrator is not sufficiently accurate for many applications. It is difficult to make a motor having a shaft output accurately proportional to an input signal even in the case of expensive special purpose motors. Consequently, accuracy was not obtainable at a reasonable cost and was difficult to achieve even in expensive apparatus.

Another prior art integrator has a servomechanism to rotate an input shaft from a reference position through an angular displacement proportional to the amplitude of an electrical input signal. The integrator has an output shaft which is engaged or coupled to the input shaft while this rotation is taking place. When this is finished, the two shafts are uncoupled and the input shaft is rotated back to the reference position. After a short time interval the entire operation is repeated so that the total angular displacement of the output shaft is proportional to the time integral of the input signal. In this type of integrator, to obtain accurate integration, the servomechanism must be extremely precise with regard to mechanical positioning and electrical conformity, and also the device is relatively complex.

With regard to these and other types of prior integrating devices, it is difficult to achieve reasonably accuracy and then only by using expensive and complex apparatus that is frequently easily disturbed by external conditions.

In the present invention, the integrating device performs the integrating function on the basis of time which can be measured very accurately. That is; the device uses a clock driven shaft on which time and position may be considered synonymous.

According to one form of the present invention, there is provided a constant speed motor, such as a clock motor, having a driving shaft, and an output shaft for driving a counter or otherwise indicating accumulated rotational movement. A comparing means adapted to detect equality of a characteristic of two signals applied thereto is connected to receive the input signal having the varying characteristic to be integrated and a reference. The reference is generated or formed by a generating means and has a characteristic similar to the characteristic of the input signal which varies periodically between predetermined limits. The limits are selected to be on either side of the input signal variation. The generating means may conveniently have its period controlled from the constant speed motor. A first time, that is a time instant, is established as the characteristic of the reference passes a predetermined value, and the comparing means provides an indication as the values of the characteristics of the input and the reference are equal and establishes a second time instant at which such equality occurs. The constant speed motor is arranged to drive the output shaft at a constant speed for a time interval defined by the first and second time instants. Thus the angular displacement of the output shaft represents the time integral of the input signal.

It is an object of the invention to provide an integrating device of novel design affording reasonably accurate integration of an electrical input signal.

It is another object of this invention to provide a relatively inexpensive electro-mechanical integrating device which functions on a time basis.

Figure 2:
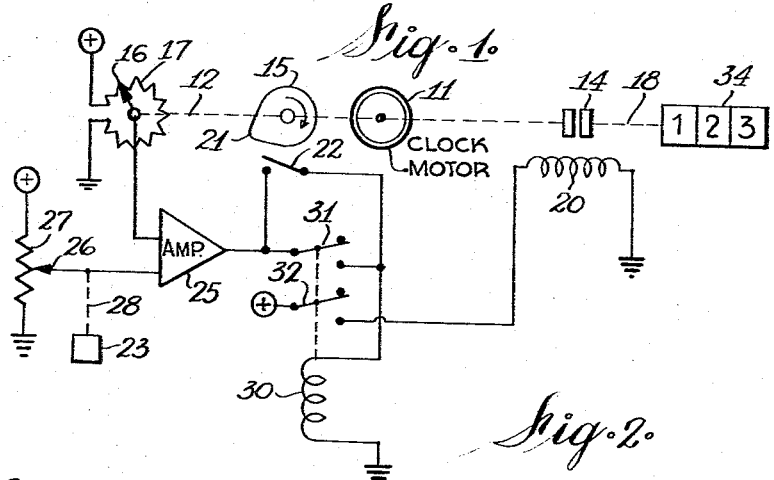
Figure 3:
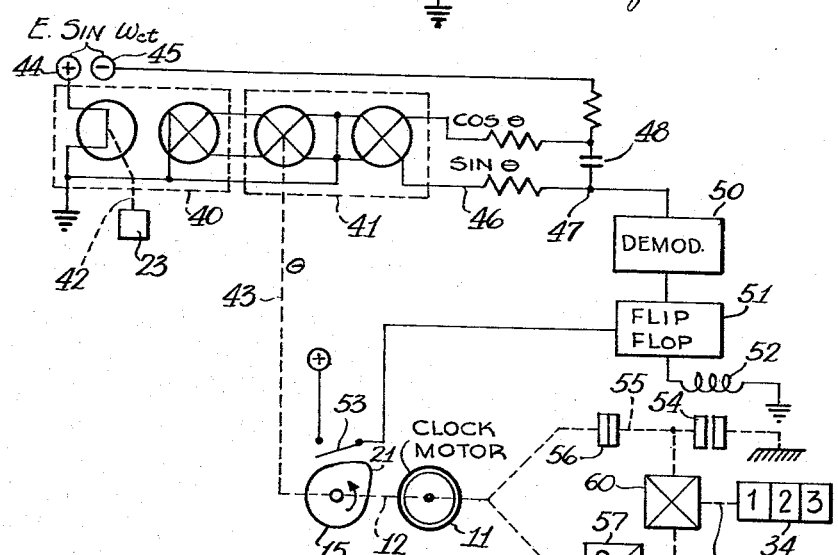
Figure 4:
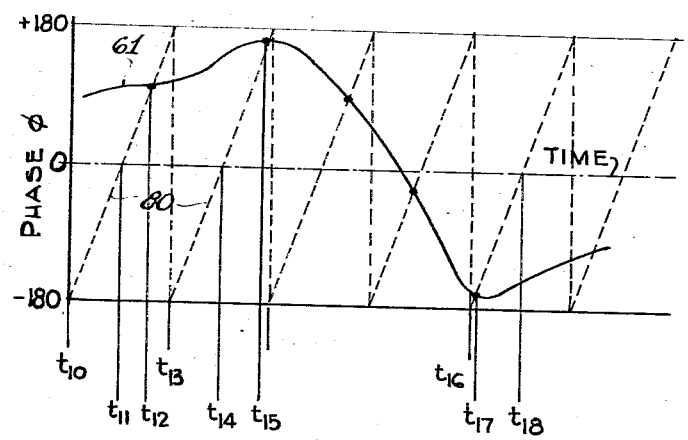
Figure 5:
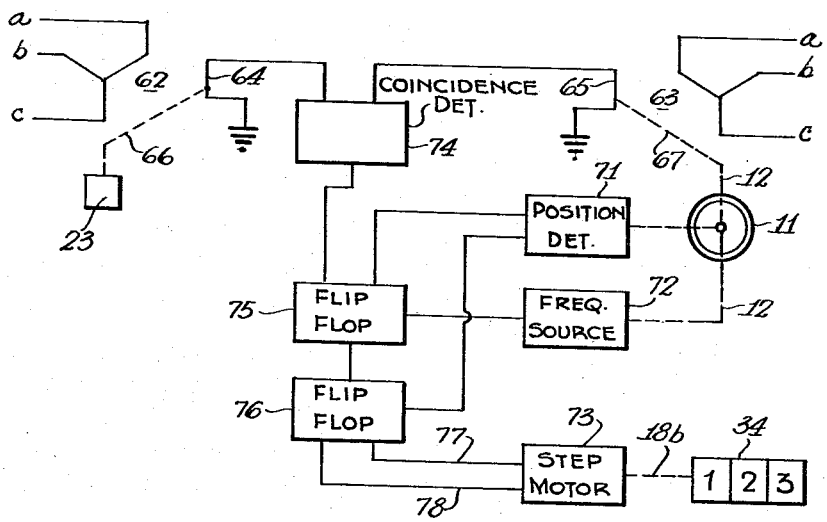

These and other objects and advantages of the invention will be better understood from the following description taken in conjunction with the accompanying drawings, in which FIGURE 1 is a graph useful in explaining the operation of an embodiment of the invention, FIGURE 2 is a schematic diagram of one embodiment of the invention, FIGURE 3 is a schematic diagram of another embodiment of the invention, FIGURE 4 is a graph useful in explaining the operation of another embodiment of the invention, and FIGURE 5 is a schematic diagram of an integrator according to another embodiment of the invention operating in a manner indicated by FIGURE 4.

Referring now to FIGURE 1, there is shown a graph of voltage vs. time on which is depicted an electrical signal or wave 10 having a voltage whose amplitude varies as a function of time. The amplitude of signal 10, in this case, is always on the same side of a reference level, i.e. as shown in FIGURE 1 the amplitude is always positive. The signal 10 represents an input signal which is to be integrated, and the integrating device of FIGURE 2 is capable of integrating such a signal.

Referring to FIGURE 2, there is shown a clock motor 11 or other constant speed motor having an accurate output and which continuously rotates a driving shaft 12 at a constant speed. Connected to driving shaft 12, to be driven thereby, are a magnetically operated clutch 14, a cam 15, and a wiper 16 contacting a resistance 17. Clutch 14, which may be of the type described in "Electronic Instruments," vol. 21, M.I.T. Radiation Laboratory Series, about page 392, is mounted between driving shaft 12 and an output shaft 18, so that when coil 20 of clutch 14 is energized the clutch 14 engages to couple output shaft 18 to driving shaft 12. When coil 20 is de-energized, clutch 14 is disengaged and shaft 18 does not rotate with shaft 12. Cam 15 has a raised part 21 which engages a switch 22 as cam 15 rotates causing momentary closing of switch 22. In effect, switch 22 is a position indicator which provides an output indication as the driving shaft 12 passes a predetermined position. The wiper 16 is driven by shaft 12 to make a series of sweeps across resistance 17 which is connected between a voltage source and ground. Consequently, there is a voltage on wiper 16 which varies periodically and linearly between limits determined by the voltage across resistance 17.

Referring briefly to FIGURE 1, the voltage at wiper 16 is represented by a sawtooth wave 24 which varies as shown between limits of zero and voltage V. Wave 24 may be referred to as a reference, and its limits are chosen so that signal 10 does not exceed them.

In FIGURE 2, the voltage at wiper 16 is applied as one input to an amplifier 25. The other input to be applied to amplifier 25 is the input signal to be integrated. The input signal must be in the same form as the reference, that is; it must be an electrical signal whose amplitude is the varying characteristic. If the input signal is in this form it is applied directly to amplifier 25. If the input signal is not in this form but is in another form, it must be changed. For example, if the input signal is in a positional form such as is represented by the rotational position of a shaft, it may be changed to the required form, as shown in FIGURE 2. The input signal is introduced at input 23 and its value is represented by the position of shaft 28, and shaft 28 positions a wiper 26 on resistance 27. Resistance 27 is connected between a voltage source and ground, and consequently the voltage on wiper 26 represents the input signal such as is indicated by 10 in FIGURE 1. Other forms of input signal may be changed to the required form by other means known in the art.

Amplifier 25 is arranged to provide an output when the voltage from wiper 26 or the input signal voltage is different from the reference voltage from wiper 16. Thus, for example, if the input signal voltage is greater than the reference voltage, an output is provided from amplifier 25, but the output falls to zero when the input signal voltage equals the value of the reference voltage. Therefore, the amplifier acts as a comparing means or a detecting means for detecting the condition of equality of the two inputs.

A solenoid operated switch having a solenoid coil 30 and two normally open switches 31 and 32 is connected in the circuit following amplifier 25. The output amplifier 25 is connected to one side of solenoid operated switch 31 and to one side of switch 22. The other side of both switches 31 and 22 goes to one side of coil 30, the other side being connected to ground. One side of switch 32 is connected to a power source and the other side to one side of coil 20 of clutch 14. The other side of coil 20 is grounded.

The operation of the integrator of FIGURE 2 is best described with reference to FIGURES 2 and 1 together. The clock motor 11 operates continuously to drive wiper 16, cam 15 and clutch 14. For convenience, cam 15 is arranged to close switch 22 as wiper 16 is at the beginning of a sweep. That is; switch 22 is closed momentarily once each cycle of the reference voltage at times $t_1$, $t_3$, $t_5$ and so on. The times $t_1$, $t_2$, $t_3$, etc., are referred to in this description as time instants to help distinguish from the terms time interval or time period. Thus, a time interval or period of time may be defined by two time instants. At time instant $t_1$ the voltage of signal 10 is greater than the reference voltage 24, and therefore amplifier 25 provides an output which is applied via closed switch 22 across solenoid coil 30 energizing the coil and closing switches 31 and 32. Switch 22 opens as cam 15 continues to rotate but the amplifier output is maintained across solenoid coil 30 by switch 31. The amplifier 25 continues to provide an output until time instant $t_2$ when the voltage of signal 10 and the voltage of the reference become equal at point 33. At the time instant of this equality, $t_2$, the output of amplifier 25 is zero, solenoid coil 30 is no longer energized, and switches 31 and 32 are permitted to open. As will be seen, the entire cycle repeats continuously.

It will be seen that the period of time $t_1-t_2$ is proportional to the amplitude of signal 10 at time instant $t_2$, and that the period of time $t_3-t_4$ is proportional to the amplitude of signal 10 at time instant $t_4$, and so on. Now, switch 32 is closed for the periods $t_1-t_2$, $t_3-t_4$, and so on, energizing coil 20 of clutch 14 for these periods and coupling shaft 18 to shaft 12 for these periods. Therefore, the angular displacement of shaft 18 represents the time integral of signal 10. For accurate results, the period of the reference should be short relative to the rate at which signal 10 varies.

It will be apparent, of course, that the integrator could be arranged to give an opposite integrated output. In other words, the clutch 14 could be engaged for the periods of time $t_2-t_3$, $t_4-t_5$, etc.

The integrator of FIGURE 2 integrates in only one direction. In many application it is desirable to have an output counter which may go forwards or backwards depending on the value of the input signal being integrated. FIGURE 3 shows such a bi-directional integrator. The integrator of FIGURE 3 also includes other changes alternative to the arranged in FIGURE 2. For example, alternative arrangements are used to replace the continuously rotating potentiometer contact 16 and to replace the solenoid switches 31 and 32 and thereby reduce wear.

Referring now to FIGURE 3, two synchro resolvers 40 and 41 are shown having rotatable shafts 42 and 43, respectively. These resolvers are of a type well known in the art, as will be apparent, and descriptions may be found, for example, in Chapter 3 of "Servomechanism Practice" by Ahrendt. A positional input 23 positions shaft 42 applying the input signal to the resolver. A carrier voltage $+E.\sin W_{ct}$ and $-E.\sin W_{ct}$ is introduced at terminals 44 and 45 respectively. As before, a clock motor 11 has a driving shaft 12 which is coupled to shaft 43 introducing a reference rotational angle $\theta$ to resolver 41. The resolver circuit thus has the necessary input signal and a rotational reference signal. The reference signal should have only one null or zero in 360° rotation of shaft 43, that is; in 360° rotation of the movable coil in resolver 41. The explanation of how this is done is given below.

The resolver 41 has an output sine winding and cosine winding as indicated. The voltage from the sine winding on 46 is used as a controlling voltage with a modifier added to eliminate one of the zeros or nulls. If the effect of the carrier frequency is neglected for the moment, and if the amplitude E is taken as one, then the resolver circuit would provide at the output point 47 a voltage $$\cos \theta + (-1) + \sin \theta \quad (1)$$

The term $\cos \theta - 1$ would have zero amplitude when $\theta = 0°$ and maximum amplitude when $\theta = 180°$. Thus, the voltage presented by the term $\cos \theta - 1$ has one null or one zero for 360° rotation of $\theta$. However, this null is not a sharp null but is quite broad. In other words, the rate of change of the voltage at point 47 is not great for values near $\theta = 0°$, or if $v$ is the voltage at point 47, then $$\frac{dv}{d\theta} = 0$$

when $\theta = 0°$. It is desirable to have a sharp null for accurate timing and this is achieved by the addition of the term $\sin \theta$. The $\sin \theta$ term changes quickly in the vicinity of $\theta = 0°$ and the addition of this term gives a good rate of change to the expression represented by Equation 1 at values of $\theta$ near zero.

It will be seen from Equation 1 that other nulls occur due to anti phase cancellation when the $\sin \theta$ and $\cos \theta - 1$ terms are equal in magnitude and opposite in sign. These unwanted nulls may be removed by making the two terms unequal in time phase by shifting one of the quantities by a small angle $\alpha$ before adding them. This will be apparent from the following explanation. If the carrier frequency represented by $\sin W_{ct}$ is taken into consideration, and if the time rate of change is $\theta$ is called $W_{mt}$ and taken into consideration, then Equation 1 becomes $$\cos W_{mt}.\sin W_{ct} - \sin W_{ct} + \sin W_{mt}.\sin W_{ct} \quad (2)$$

Equation 2 then represents the voltage at point 47. The angle $\alpha$ is introduced by capacitor 48 and the Equation 2 is thus modified to give the voltage at point 47 as $$K[(\cos W_{mt}-1).\sin (W_{ct}+\alpha)] + \sin W_{mt}.\sin W_{ct} \quad (3)$$

The factor K need be only a small fraction because the cosine term is only a modifier.

There are several alternate ways of providing a signal at point 47 which has one null per cycle and sweeps across a desired range of values. The signal at point 47 is a modified suppressed carrier signal carrying the input signal and reference information as modulations. This signal is demodulated by a demodulator 50 and is applied to a flip-flop stage 51. Thus, the demodulated signal is a voltage signal which, in effect, represents input signal 10 and reference 24 of FIGURE 1.

Flip flop 51 controls power applied to coil 52, and is, therefore, somewhat equivalent to the solenoid operated switch in the FIGURE 2 embodiment controlling the power to coil 20. Flip flop 51 has two conditions—one in which a voltage is applied across coil 52 to energize it, and one in which coil 52 is not energized. The rotation of cam 15 on shaft 12 brings the raised part 21 of cam 15 into engagement with switch 53 momentarily closing switch 53 and triggering flip flop 51 to a state or condition where coil 52 is energized. Cam 15 is arranged so that this occurs as shaft 43 is in a position 180° rotated from a zero reference position. Flip flop 51 is triggered to its other state or condition where coil 52 is not energized when the voltage from demodulator 50 reaches a preset value, that is: flip flop 51 detects the reaching of this preset value. This value may conveniently be a zero occurring when the angles of the input shaft 42 and reference shaft 43 are equal, i.e., the signals coincident. Flip flop circuits of this type are well known in the prior art. Thus flip flop 51 switches back and forth between two states periodically energizing and de-energizing coil 52. The sum of the time that the coil 52 is energized and the following time it is de-energized represents one cycle and is constant. The ratio of the time that the coil 52 is energized to the time it is de-energized varies as the voltage from demodulator 50.

Coil 52 is part of a magnetically operated brake. When coil 52 is energized it operates brake 54 preventing rotation of shaft 55. Shaft 55 is driven through a slip clutch 56 from shaft 12 of clock motor 11. Also driven by shaft 12 is a gear box 57 having an output shaft 58 rotating at half the speed of the driving shaft 12. A differential 60 is coupled to shafts 55 and 58 and has an output shaft 18a driving a counter 34.

It will be seen that with coil 52 energized and shaft 55 braked, the output shaft 18a is driven in one direction at a speed equal to half the speed of clock motor shaft 12. When coil 52 is de-energized, shaft 55 rotates at the speed of shaft 12 while shaft 58 still rotates at half the speed of shaft 12. The output shaft 18a then rotates in the opposite direction at half the speed of shaft 12. In other words, the output shaft is driven backwards or forwards at the same speed according to whether coil 52 is energized or not. If the coil 52 is energized and de-energized for the same length of time, the output shaft will not rotate noticeably or will oscillate about a mean, depending on the system gearing.

The operation of the FIGURE 3 embodiment should now be apparent. The flip flop 51 is triggered to a state where coil 52 is not energized when there is a null at point 47. There is a null at point 47 when the shafts of the two synchros are in the same position. Now, as was previously mentioned, switch 53 is closed when shaft 43 has rotated 180° from a zero reference position. It is convenient to arrange synchro 40 so that a zero or median input signal positions shaft 42 in the same position as the zero reference position. If this is done, with a zero input signal, the following sequence of events would take place. Switch 53 closes triggering flip flop 51 to a state where brake 54 is applied. Shaft 43 then rotates through 180° to its zero reference position, and because the synchro shafts are in the same position the flip flop 51 is triggered to its other condition releasing brake 54. Shaft 43 continues to rotate to its 180° position where switch 53 is again closed. The time for which the brake is applied and released for this input of zero is the same, and consequently, there is no net rotation of the output shaft. As the shaft 42 is rotated to represent input values above or below zero, there will be a net rotation in the output shaft representing the time integral of the input.

It will, of course, be apparent that the embodiments of FIGURES 2 and 3 are quite similar, and various portions may be interchanged. For example, the split drive for the output of FIGURE 3 including clutch 56, brake 54, gear box 57 and differential 60 could be used in the FIGURE 2 embodiment by choosing a reference voltage half way between the limits of zero and V of FIGURE 1. If point 33 (FIGURE 1) fell below the reference voltage, the net rotation of the output shaft would be in one direction, and if point 33 were above the net rotation would be in the other direction.

The embodiment of FIGURE 5 integrates an incoming signal having a varying phase characteristic. On the graph of FIGURE 4 where phase $\phi$ is plotted against time, there is shown a wave or signal 61 which varies in phase on either side of a zero phase reference. Reference will subsequently be made to FIGURE 4 in more detail in explaining the operation of FIGURE 5.

Referring now to FIGURE 5, a three phase reference voltage is used whose phases are indicated as $a$, $b$ and $c$, and these voltages are applied to two conventional synchros 62 and 63 having movable windings 64 and 65 respectively. Windings 64 and 65 are rotated by shafts 66 and 67 respectively. The shaft 66 is rotated according to an input at 23, or alternately a signal of varying phase with respect to the same reference may be directly applied. Shaft 67 is rotated by clock motor 11 and its drive shaft 12. A position detector 71 is also connected to shaft 12 to detect the rotational position hereof, and a precise frequency source 72 is connected to shaft 12. The frequency source 72, for example, may generate pulses according to the movement of magnetic inserts carried on a portion of shaft 12, or other mechanisms relating the rotational shaft movement to generated pulses may be used. The frequency source 72 is used to drive a step motor 73 which, in turn, drives an output shaft 18b. This arrangement of frequency source 72 and motor 73 in effect permits an electrical driving coupling between shaft 12 and shaft 18b and obviates the need for a mechanical clutch and brake arrangement such as was used in FIGURE 3. It will, however, be apparent that either arrangement may be used.

A coincidence detector 74 is connected between the synchros 62 and 63 to provide an output pulse when the input at winding 64 and the reference at winding 65 are equal. The detector 74 could, for example, be a phase detector of a type based on the circuit and description about page 484 of "Electron Tube Circuits" by Seely. The coincidence pulse from coincidence detector 74 is applied to a flip-flop 75 as a triggering pulse. Flip flop 75 has two states or conditions—one which passes the pulses from source 72 to a flip flop 76 and one which does not pass pulses from source 72. Flip flop 76 has two conditions or states—one which directs any received pulses to output 77 and one which directs any received pulses to output 78. Output 77 drives motor 73 in one direction and output 78 drives it in the other direction. The position detector 71 is arranged to provide a pulse output when shaft 67 is in a position where the reference is 0° and 180°, and both these pulses are applied to each of flip flops 75 and 76.

Flip flop 75 receives three triggering pulses, i.e., a coincidence pulse, a 0° pulse and a 180° pulse. Flip flop 76 receives a 0° triggering pulse and 180° triggering pulse. Flip flop 76 is operated back and forth between its two states regularly by the 0° and 180° pulses. The operation of FIGURE 5 is best explained with reference to FIGURE 4.

In FIGURE 4 the reference is shown as a sawtooth wave 80 having a continuously varying phase which sweeps between the two limits of −180° and +180°. At time instant $t_{10}$ the flip flop 75 is in its "off" state (i.e. not passing pulses from source 72) and flip flop 76 is switched to deliver any output it receives to output 77 which may be the "reverse" drive. There, is, of course, no output drive as flip flop 75 is "off."

Flip flop 75 is switched to "on" (i.e. to a state passing pulses from source 72 to flip flop 76) either by receiving a coincidence pulse or by receiving a 0° pulse, whichever is first. It is switched back to "off" by the other pulse, i.e. by the coincidence pulse or the 0° pulse, whichever is second. The 180° pulse is applied to flip flop 75 as a safety measure to ensure the flip flop 75 is in the "off" position at 180°.

At time instant $t_{11}$ there is a 0° pulse and flip flop 75 is switched to "on" and flip flop 76 is switched to "forward." The pulses from source 72 pass to motor 73 and output shaft 18b starts to rotate in the forward direction driving counter 34. At time instant $t_{12}$ there is a coincidence pulse which switches flip flop 75 "off" stopping motor 73. Thus motor 73 is driven forward at a constant rate for a period of time represented by $t_{11}$–$t_{12}$. At time instant $t_{13}$ a 180° pulse ensures that flip flop 75 is "off" and switches flip flop 76 to "reverse." In the next cycle the motor 73 is driven forward at a constant rate for a time $t_{14}$–$t_{15}$, and so on.

Considering now the time $t_{16}$, the flip flop 75 is "off" and flip flop 76 is in "reverse." Slightly later, at time instant $t_{17}$ a coincidence pulse triggers flip flop 75 to "on" and pulses are pasesd from source 72 to drive motor 73 in the reverse direction. At time instant $t_{18}$ a 0° pulse switches to flip flop 75 to "off" and flip flop 76 to "forward." Thus, for a time $t_{17}$–$t_{18}$ the motor 73 is driven in the reverse direction. The integrator functions to integrate both positive and negative phase changes.

The integrator of the present invention is relatively inexpensive and performs an integrating function on the basis of time affording a simple and reasonably accurate integration of an input signal.

In the foregoing description, the reference signal has been described as varying periodically and linearly between limits. This would, of course, be most widely used and most convenient. It is, however, not essential that the reference signal vary in a linear manner with time. If, for example, it was required to have an output which was the time integral of a function of the input rather than of the input itself, then the reference signal could be formed in a suitable non-linear manner.

I claim:

1. A device for providing an output which is proportional to the time integral of an input signal, comprising detecting means having a first and a second input and an output, said first and second input for receiving respectively an input signal independent of the output from said detecting means and having a characteristic variable according to a quantity to be integrated, and a reference signal having the same characteristic as said input signal varying periodically with time, said detecting means detecting equality of values of said characteristic of said signals at said first and second inputs and providing at said output a first output signal establishing a first time instant at which equality occurs, periodic characteristic reference generating means for generating a stable reference signal having said characteristic varying linearly between predetermined limits with a sawtooth waveform and a constant period, means connecting said reference generating means to said second input for applying thereto said reference signal, time indicating means connected with said reference generating means for providing a second output signal establishing a second time instant at which said characteristic generated by said reference generating means passes a predetermined constant value, an output shaft, and constant speed driving means responsive to said first and second output signals for driving said output shaft at a constant speed for a time interval defined by said first and second time instants, providing on said output shaft an accumulated rotation proportional to the time integral of said characteristic of said input signal.

2. A device as defined in claim 1 and further comprising a rotatable shaft coupling said constant speed driving means with said reference generating means and said time indicating means, said reference generating means being responsive to the rotation of said rotatable shaft to control the period of said reference signal in relation to rotation of said rotatable shaft, said time indicating means being responsive to the rotation of said rotatable shaft for providing said second output signal at time instants related to the rotation of said rotatable shaft.

3. An integrating device comprising a clock motor having a constant speed driving shaft, an output shaft for turning a counter to indicate an integrated value, a magnetically actuated clutch coupling said output shaft and said driving shaft, an amplifier having a first amplitude varying input signal input, a second reference signal input, and an output, said amplifier being so constructed and arranged to provide an output only when the signal amplitude at said first input exceeds that at said second input, electrical signal generating means having a rotatable control element connected to said driving shaft for rotation therewith, said electrical signal generating means being responsive to rotation of said control element for forming a reference signal having a sawtooth amplitude waveform periodically related to the rotation of said element, circuit means connecting said signal generating means to said second input to apply thereto said reference signal, a solenoid operated switch having a solenoid coil and a first and second switch, said first switch having a normally open and a closed position and being connected between the output of said amplifier and said solenoid coil, said second switch having a normally open and a closed position and being connected between a source of power and said magnetically actuated clutch for energizing said clutch and coupling said output shaft to said driving shaft in response to operation of said second switch to its closed position, a third switch having an open and a closed position and being connected between the output of said amplifier and said solenoid coil, a cam connected with said driving shaft for rotation thereby and having a raised portion for momentarily closing said third switch at a time when said reference signal has a predetermined value less than the value at said first input permitting energization of said solenoid by said amplifier output to close said first and second switches, said first and second switches remaining closed causing rotation of said output shaft until the output of said amplifier ceases.

4. An integrating device comprising a constant speed motor having a driving shaft, a differential having a first and second input and an output shaft, a slip clutch coupling said first input to said driving shaft, brake means having an actuated and a released condition coupled to said first input for braking said first input in said actuated condition causing slipping of said clutch, a gear means having a 2:1 ratio coupling said second input to said driving shaft for driving said second input at half the speed of said driving shaft, said differential output shaft being driven by said first and second inputs in a first direction at half the speed of said driving shaft, and being driven by said second input in a second direction opposite said first direction at half the speed of said driving shaft with said brake means in an actuated condition braking said first input, circuit means for receiving an electrical input signal having a characteristic which is variable between a lower and an upper limit, signal generating means for generating a reference having a characteristic the same as the variable characteristic of said input signal periodically and linearly varying between said lower and said upper limits, means associated with said signal generating means for providing a first time signal indicative of a first time instant as said characteristic of said reference passes said lower limit, detecting means connected with said circuit means and said signal generating means for detecting a value representing equality of said input signal and said reference and for providing a second time signal indicative of a second time instant at which said value is detected, and actuating means for said braking means connected to said means associated with said signal generating means and said detecting mens to receive said first and second time signals and responsive thereto for operating said brake means to said actuated condition for a time interval defined by said first and second time instants.

5. An integrating device comprising
a clock motor having a constant speed driving shaft,
a differential having a first and second input and an integrated signal output shaft,
a slip clutch coupling said first input to said driving shaft,
a magnetically operated brake having an actuated and a released condition coupled to said first input for braking said first input in said actuated condition causing slipping of said clutch,
a gear box having a 2:1 ratio coupling said second input to said driving shaft for driving said second input at half the speed of said driving shaft,
said differential output shaft being driven by said first and second inputs in a first direction at half the speed of said driving shaft, and being driven by said second input responsive to braking of said first input in a second direction opposite said first direction at half the speed of said driving shaft, and being driven by said second input responsive to braking of said first input in a second direction opposite said first direction at half the speed of said driving shaft,
a first and a second resolver each having a movable winding rotated respectively by a first input signal responsive input shaft and a second reference input shaft,
first circuit means electrically coupling said resolvers, means for applying a carrier voltage to said resolvers, coupling means connected to said driving shaft and the second resolver input shaft for rotating the movable winding of said second resolver at a constant speed,
second circuit means connected to said second resolver forming therewith a signal having one null in a complete revolution of said driving shaft occurring when the first and second input shafts of said resolvers are in a predetermined relative position,
a cam having a raised portion thereon mounted on said driving shaft for rotation therewith,
a switch having an open and a closed position mounted adjacent said cam and being momentarily operable to said closed position responsive to engagement by said raised portion once in a complete revolution of said driving shaft,
said first and second resolvers being so arranged that for a zero input positioning the input shaft of said first resolver the shaft of said second resolver reaches said predetermined relative position when said driving shaft has rotated 180° past the position momentarily closing said switch, and
a flip flop connected to receive a triggering signal from said switch and from said second circuit means and having a first condition energizing said brake to an actuated condition and a second condition releasing said brake,
said flip flop being triggered to its first condition by closing of said switch and to its second condition by a null from said second circuit means.

6. An integrating device comprising
a constant speed motor having a driving shaft,
a pulse source connected to said driving shaft providing a train of pulses having a frequency dependent upon the rotational speed of said driving shaft,
a reversible step motor having an output shaft, a first input for receiving pulses provided by said pulse source to drive said output shaft at a constant speed in one direction, and a second input for receiving pulses provided by said pulse source to drive said output shaft at a constant speed in the opposite direction,
an alternating voltage reference source,
a synchro having a stationary winding electrically connected with said reference source and a movable winding rotatable by a shaft coupled to said driving shaft,
said synchro forming on the movable winding thereof a reference voltage continuously changing in phase from −180° through 0° to +180° with respect to the voltage from said voltage reference source,
a position detector connected to said driving shaft so arranged and constructed to provide a 0° triggering pulse when the driving shaft is in a position providing a reference voltage having a phase shift of 0° on said movable winding, and to provide a 180° triggering pulse when the driving shaft has rotated 180° to a position providing a reference voltage having a phase shift of 180° on said movable winding,
means electrically connected with said movable winding for applying thereto an input signal voltage having a phase variable between −180° and +180° with respect to the voltage from said voltage reference source,
a coincidence detector electrically connected to said movable winding for detecting phase coincidence between the continuously changing phase reference voltage and the input signal voltage and for providing a triggering coincidence pulse responsive to coincidence detection,
a first flip flop connected to said coincidence detector and said position detector for receiving triggering pulses therefrom, and having an input connected to said pulse source and an output,
said first flip flop having a first condition preventing passage of pulses from said pulse source to said output of said first flip flop and a second condition providing passage for said pulses from said pulse source to said output, and being triggered to its second condition by a first received pulse of a group of pulses consisting of said coincidence pulse and said 0° pulse and being triggered to its first condition by the second received pulse of said group, and a second flip flop connected to said position detector for receiving triggering pulses therefrom, and having an input connected to the output of said first flip flop and first and second outputs respectively connected to said first and second inputs of said step motor, said second flip flop having a first and a second condition respectively providing passage for pulses from the input thereof to the first output thereof and from the input thereof to the second output thereof, and being triggered to its first condition by a 0° pulse and to its second condition by a 180° pulse.

7. An integrating device as defined in claim 6 in which said means electrically connected with said movable winding for applying thereto an input signal voltage comprises a second synchro having a stationary winding electrically connected to the reference source and a movable winding rotatable by an input signal positioning shaft, the movable winding of said second synchro and the movable winding of the first synchro being electrically connected.

References Cited
UNITED STATES PATENTS

| | | |
|---|---|---|
| 2,502,308 | 3/1950 | Brunn. |
| 2,921,247 | 1/1960 | Morrison. |
| 3,079,539 | 2/1963 | Guerth. |
| 3,131,340 | 4/1964 | Johnson et al. |

ORIS L. RADER, *Primary Examiner.*

T. LYNCH, *Assistant Examiner.*